Figure 1:
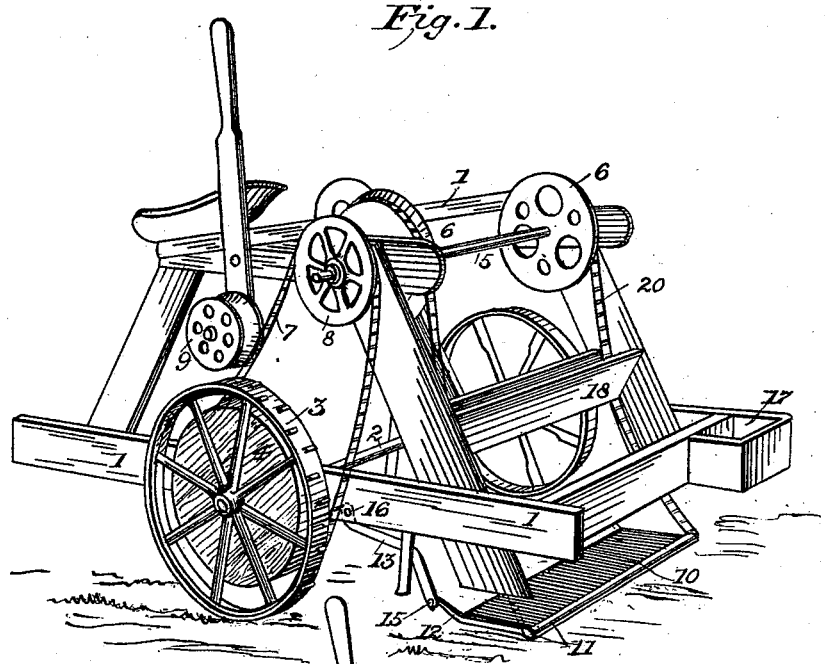

(No Model.) 2 Sheets—Sheet 1.

R. P. SCOTT.
GATHERING AND HULLING GREEN PEAS FROM THE VINES.

No. 499,397. Patented June 13, 1893.

Witnesses:

Inventor:
Robert P. Scott (No Model.) 2 Sheets—Sheet 2.
R. P. SCOTT.
GATHERING AND HULLING GREEN PEAS FROM THE VINES.
No. 499,397. Patented June 13, 1893.
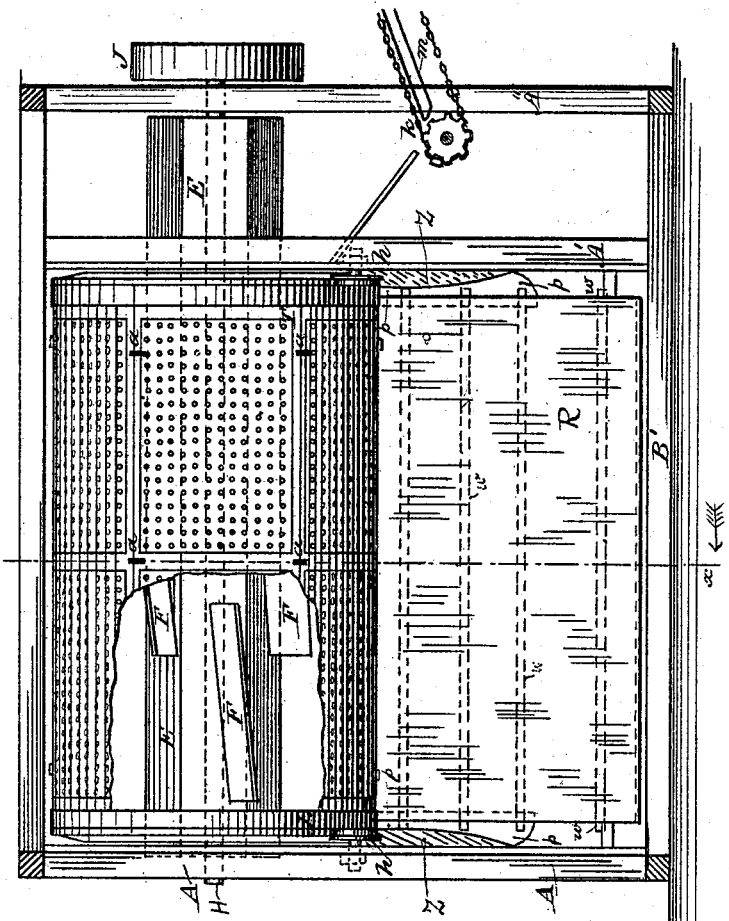
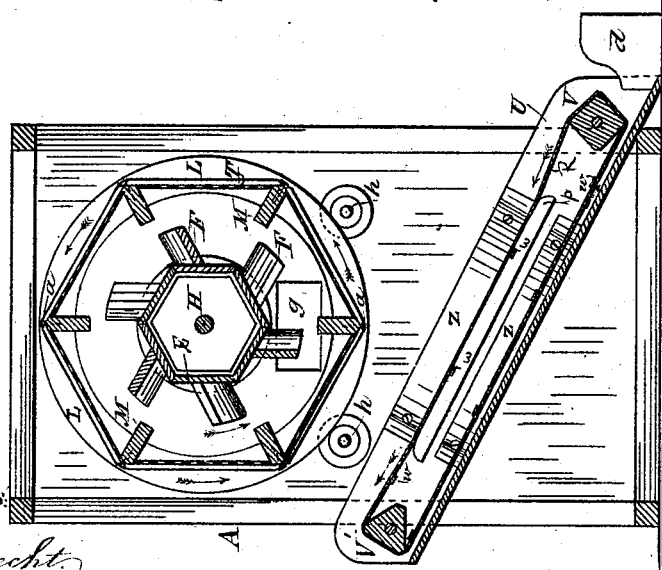
Witnesses:
T. C. Brecht
H. Ken Bradford
Inventor
Robert P. Scott

UNITED STATES PATENT OFFICE.

ROBERT P. SCOTT, OF CADIZ, OHIO.

GATHERING AND HULLING GREEN PEAS FROM THE VINES.

SPECIFICATION forming part of Letters Patent No. 499,397, dated June 13, 1893.

Application filed November 12, 1892. Serial No. 451,835. (No model.)

*To all whom it may concern:*

Be it known that I, ROBERT P. SCOTT, residing at Cadiz, Harrison county, Ohio, have invented a certain new and useful Process of Gathering and Hulling Green Peas from the Vines, of which the following is a specification, reference being had to the accompanying drawings.

Until the invention of the mechanical impact process of hulling green peas by C. P. Chisholm and J. A. Chisholm, covered in United States Patent No. 421,244, granted February 11, 1890, green peas had uniformly been hulled by hand in the practical art. The process of this patent relates to the hulling of picked green peas. My invention is an improvement upon this process by which I gather the vines with the green peas attached from the field by any suitable means, such as a rake or pulling machine, and then subject the mass of vines and attached green peas to the action of mechanical hulling appliances preferably impact devices working according to the process of the Chisholm brothers.

The gist of my invention lies in the discovery and the demonstration of the practicability of the idea that green peas could be hulled automatically while they are attached to their vines. It is old, as stated, to hull picked green peas mechanically by a gentle impact. It is old to hull dry ripe peas on the dried vines by subjecting them to the violent action of mechanical hulling appliances which tear the vines apart and do not injure the hard, dry peas but which would ruin green peas, either on the vine or off. Before my invention however, it was never conceived to be possible or conceived at all that the gentle impact of the Chisholm process was sufficient to reach and operate on such peas when attached to, entangled in or covered by a mass of green vines. In fact it was never even suggested that the green peas attached to the vines could be reached for hulling by even the most vigorously acting mechanical appliances which had been patented for hulling picked green peas before the invention of the Chisholm brothers, to say nothing of the fact that all such appliances were commercially unsuccessful since they bruised the peas.

I shall illustrate the execution of the several steps of my process by effective machinery for the purpose, the step of removing the vines from the field being shown as performed by a pulling machine invented by me and the steps of hulling and separating being shown as performed by a machine of which I am co-inventor with J. A. Chisholm, of Oakville, Canada, for which we have filed an application for patent, Serial No. 391,323, dated May 2, 1891. A somewhat less effective machine for same purpose has been patented to us on May 19, 1889, No. 399,702.

Figure 3:
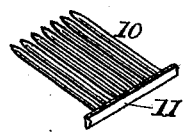
Figure 2:
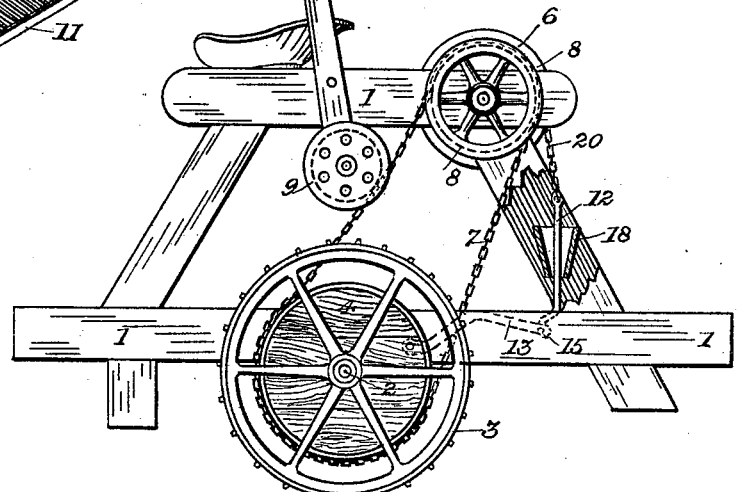

In the drawings: Figure 1 shows a perspective view of the vine pulling machine with the pulling fingers on the ground; Fig. 2 a side elevation of the same, part of the frame being broken away, with the pulling fingers raised to discharge the vines; Fig. 3 a detail of a portion of the pulling fingers; Fig. 4 a side elevation of the hulling and separating machine and Fig. 5 a section of the same on the line X X of Fig. 1 looking in the direction of the arrow.

The vine pulling machine consists of a frame 1 carried upon wheels 3 supported on an axle 2. The parallel pulling fingers 10 are attached at their ends to a bar 11 to which are rigidly fixed arms 12 swiveld at 15 in links 13 pivoted at 16 to the frame of the machine. To the ends of this bar 11 are fixed chains 20 fastened to winding drums 6 on the shaft 5 which is revolved by a sprocket wheel 8 thereon, motion being communicated by the sprocket chain 7 and drum 4 on the shaft 2 by means of a belt tightener 9. The chains 20 pass through an open bottomed trough 18 which serves to discharge the vines from the fingers. A tool box is shown at 17.

In the operation of the machine, it is drawn along the ground with the pulling fingers resting upon the earth, thus gathering the vines between the fingers and forcibly drawing them up by the roots. When the fingers are full, the operator tightens the belt 7, thus communicating motion in the proper direction to the shaft 5 which winds up the chain 20 on the drums 6. The frame of the pulling fingers thus turns on 15 as a center, its back end or bar 11 rising into the air and coming directly under the opening in the bottom of the trough 18. Upon further motion, the bar 11 and fingers 10 pass up into this trough, the sides of which strip the vines from the fingers. The fingers are then dropped by loosening the belt-tightener and the machine is ready for another operation. The vines which have been thus pulled from and discharged in heaps upon the ground are ready for the hulling and separating machine to which they may be carried.

Coming then to the description of the hulling and separating machine, it consists generally speaking of a frame A, A', A" supporting an outer open-ended drum, impact openers F carried on an inner drum E projecting beyond the discharge end of the outer drum and revolved by a pulley J and a separating apron R carried upon polygonal reels V V'. The outer drum consists of two annular end pieces L and cross bars M and is surrounded by a perforated rubber covering carried on frames T and fastened to the cross bars M by staples $a$. The annular end pieces L are supported upon rollers $h$ on the machine frame and serve to rotate the outer drum by sprocket chains passing around them which for simplicity have not been shown since the construction of this machine is not the subject of the present application. The separating apron R carries cross slats $w$ on its inner side which rest upon bottom supports $p$ attached to side boards U and are guided by side guides Z against which the ends of the slats abut. A sprocket discharge K resting upon a bed $m$ serves to carry off the hulled vines.

In the operation of this hulling and separating machine, the vines and attached green peas which have been removed from the field preferably by the pulling machine before described are fed in through the opening 8 at the left hand side of the machine in Fig. 5, whence they are drawn farther in by the impact openers F and through the inclined arrangement of these are fed to the discharge end. The cross bars M raise the vines toward the top of the machine facilitating the action. The projecting end of the drum prevents the vines from tangling around any small projecting hafting. By the action of the impact openers, the shells of the green peas are split open and the green peas discharged through the perforated rubber covering of the outer drum, according to the above mentioned Chisholm process. Falling upon the apron R, together with smaller particles of dirt and hulls, the green peas roll into the trough $d$, the friction of the apron carrying the dirt to the upper end and over the top of the apron. This action is facilitated by the fluttering of the belt produced by the polygonal reels.

I usually make the inner diameter of the outer drum four feet and its length twelve feet. This requires about two hundred revolutions per minute of the inner drum for successful operation, though this speed varies slightly according to the character of the green peas operated on.

What I claim is—

1. The process of gathering and hulling green peas consisting in removing the vines from the ground with the green peas attached, subjecting the vines and attached peas while green to the action of mechanical hulling appliances, and separating the hulled green peas from the refuse.

2. The process of gathering and hulling green peas consisting in removing the vines from the ground with the green peas attached, subjecting the vines and attached peas while green to impact, of the character described and separating the hulled green peas from the refuse.

3. The process of gathering and hulling green peas consisting in removing the vines from the ground with the green peas attached by pulling them from the ground, subjecting the vines and attached peas while green to impact, of the character described, and separating the hulled green peas from the refuse.

ROBERT P. SCOTT.

Witnesses:
THS. KELL BRADFORD,
SAML. D. BRADFORD.